United States Patent [19]

Tomlinson

[11] 4,078,750
[45] Mar. 14, 1978

[54] SPEED-VARIABLE LIMITS IN FAIL-SAFE ACTUATORS

[75] Inventor: John H. Tomlinson, Bridgeport, Conn.

[73] Assignee: United Technologies Corporation, Hartford, Conn.

[21] Appl. No.: 775,672

[22] Filed: Mar. 8, 1977

[51] Int. Cl.² .............................................. G05D 1/00
[52] U.S. Cl. ................................ 244/194; 91/363 A; 318/563; 244/17.13
[58] Field of Search ........................... 244/194, 17.13; 318/563, 564; 91/361, 363 A, 364, 411 A; 340/248 A, 248 B, 248 C

[56] References Cited

U.S. PATENT DOCUMENTS

| | | | |
|---|---|---|---|
| 3,145,330 | 8/1964 | Hecht | 318/564 |
| 3,309,588 | 3/1967 | Martin | 318/564 |
| 3,920,966 | 11/1975 | Knemeyer | 244/17.13 |

Primary Examiner—Trygve M. Blix
Assistant Examiner—Reinhard J. Eisenzopf
Attorney, Agent, or Firm—M. P. Williams

[57] ABSTRACT

A positioning device for a critical aircraft surface, such as a stabilizing elevator in a helicopter, includes a pair of reversible electric jack-screw type actuators acting in series, each being controlled in a closed-loop fashion by separate electronic hardware, the position of each as well as the rate of change thereof being compared with the other, against limits which, according to the invention, are relatively broader at low speeds and are tightened at higher speeds. If either of the positions or the rate of change of positions of the two actuators fail to track within the variable threshold disparity, an alarm condition is manifested and the actuators are disconnected from automatic control and rendered operable by manual control.

10 Claims, 1 Drawing Figure

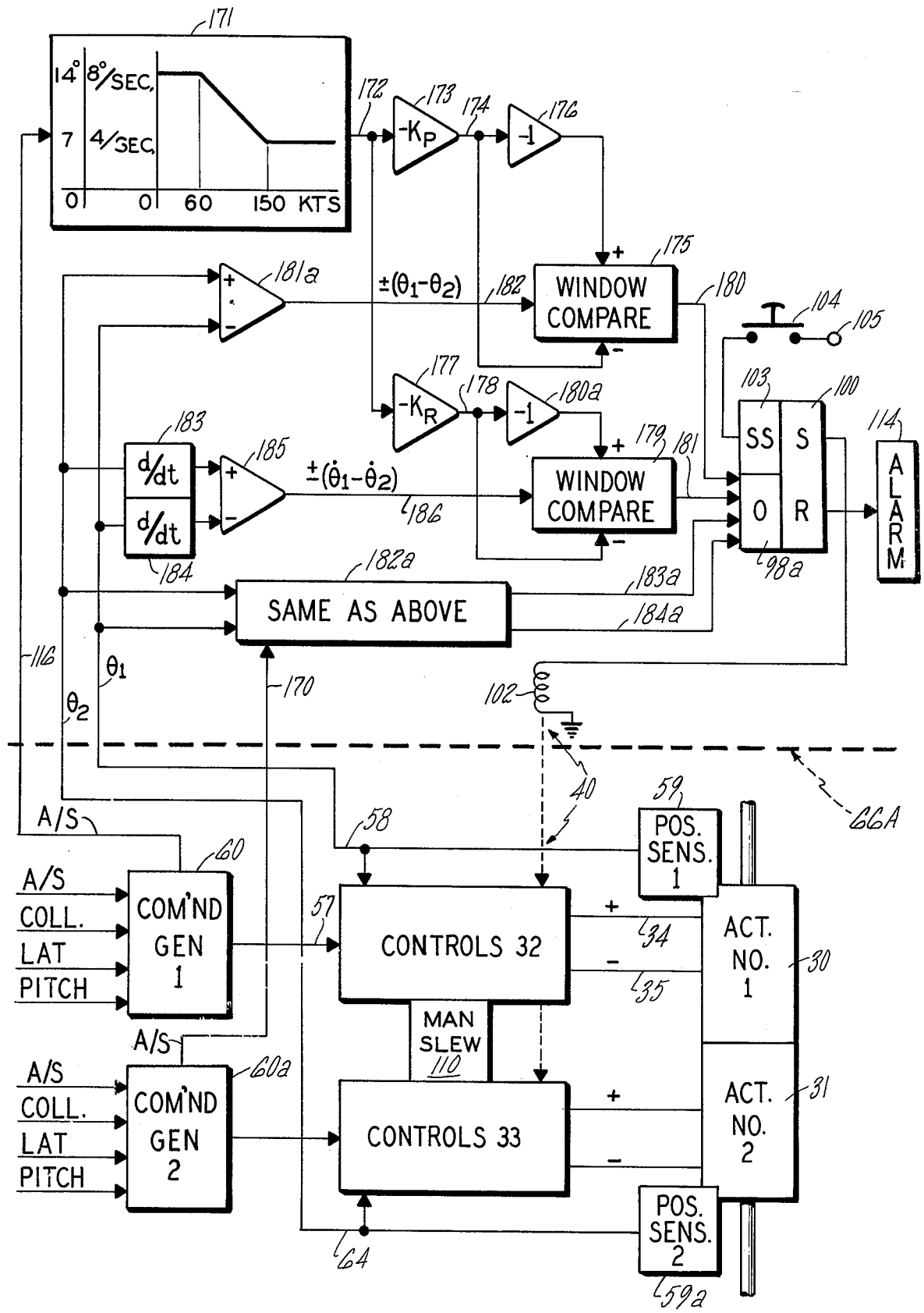

SPEED-VARIABLE LIMITS IN FAIL-SAFE ACTUATORS

The invention disclosed herein was made under or in the course of a contract with the Department of the Army.

CROSS REFERENCE TO RELATED APPLICATIONS

The invention disclosed herein is useful in conjunction with apparatus shown in greater detail in a commonly owned copending application, Ser. No. 775672, entitled VARIABLE INCIDENCE HELICOPTER STABILATOR AND FAIL SAFE ACTUATOR, filed on Mar. 8, 1977 by Johnson, Cotton, and Verzella.

BACKGROUND OF THE INVENTION

1. Field of the Invention

This invention relates to aircraft and more particularly to fail safe operation of electronically controlled positioning actuator systems.

2. Description of the Prior Art

In the aforementioned copending application, there is disclosed a helicopter having an elevating stabilizer, or stabilator, which is positioned, in response to functions of airspeed, collective pitch, lateral acceleration, and pitch rate, to various angles of incidence so as to avoid main rotor downwash at low speeds, and to provide flight stability at high speeds. The positioning means comprises a pair of actuators connected in series, each actuator being independently controlled by separate, uniquely-related electronic control systems, which cause inputs to the actuators so as to jointly accomplish desired incidence angles of the stabilator. The actual position effected by each stabilator is compared with that of the other, along with their rates of change of position. In the event that the position or the rate of positioning of the two actuators fail to track within a threshold magnitude of disparity, an alarm condition is manifested which provides a signal to the pilot and transfers control over the actuators from the electronic control systems to a manual slewing switch. In said application, the positioning of the actuators is compared against fixed limits, such as, for instance, 10° of position and 6° per second of rate of change of position.

It has now been found that the system disclosed in the aforementiond application provides difficulty in establishing the proper limits. For instance, with the limits set at 10° and 6° per second, there are an unacceptable number of nuisance shutdowns; these are shutdowns resulting from variations in inputs rather than in responses of the system. At lower speeds, it isn't necessary that the two systems track as closely as at high speeds, so there is a tendency to suggest opening up the limits to avoid the nuisance shutdowns. However, it is clear that when the limits are opened up to preclude undesirable shutdowns which are not indicative of fault, then they are so great that at high speeds, undesirable maneuvers can be created by faulty stabilator position as a result of failure of the two, completely-separate actuator systems to track properly.

It has also been found that one of the causes of the nuisance shutdowns is a failure of the airspeed sensing system to track properly; that is, that the two separate airspeed systems provide varying inputs to the two actuator control systems, so that even when the control systems are operating properly, they will naturally command different positions due to the different airspeed inputs thereto. And, in fact, the two airspeed sensing systems fail to track by magnitudes sufficient to cause the fault sensing system to operate with the 10° and 6° per second limits thereon.

SUMMARY OF THE INVENTION

Objects of the invention include provision of an improved fault detection and a fail safe actuator system that accommodates low speed errors without being prone to undesirable maneuvers at high speed.

According to the present invention, the magnitude of permissible limits of disparity of position and/or rate of change of position between two actuators acting in series on a single, critical control surface of an aircraft is varied with airspeed. In further accord with the present invention, the aforementioned disparity limits are wider at lower speeds and narrower at high speeds, said limits being controlled by airspeed of the aircraft.

In still further accord with the present invention, the limits at low speeds are on the order of twice as great as the limits at high speeds. In accordance still further with the invention, airspeed control over actuator position and rate of change of position limits are smoothly transitioned from wide limits at low speeds to lower limits at higher speeds, the transition occurring at medium speeds, all as is described more fully hereinafter.

The invention permits the use of wide limits at low speeds, wherein a greater degree of disparity of operation is permissible due to the lesser effect on aircraft maneuvering that the surface will have at the lower speeds. The invention commensurately, however, allows the use of tighter limits at higher speeds, where disparity of operation is more likely to induce undesirable maneuvers of the aircraft. The invention also tolerates the general characteristics of a pair of airspeed sensors that provide inputs to separate automatic controls of actuators, which typically rely upon pitot-static airspeed sensors, which are likely to have erratic disparity between them at lower speeds, but settle down and track more uniformly at higher speeds.

The foregoing and other objects, features and advantages of the present invention will become more apparent in the light of the following detailed description of an exemplary embodiment thereof, as illustrated in the accompanying drawing.

DESCRIPTION OF THE DRAWING

The sole FIGURE herein comprises a simplified schematic block diagram of an exemplary embodiment of the invention.

DETAILED DESCRIPTION

In the drawing, the bottom portion illustrates in broad block form, the overall stabilator control system disclosed with respect to FIG. 4 of the aforementioned application, and the upper part of the drawing illustrates the improved fault detecting system, including speed-variable limits of the present invention, which is used in conjunction with the overall system in place of the fault circuitry shown in FIG. 5 of the copending application. The reference numbers below 170 in the drawing correspond with those is said application.

A pair of actuators 30, 31 are connected in series so that the position of each of them is added to the position of the other, and jointly they control the position of a critical aircraft surface, such as the stabilator described in the aforementioned application. Each of the actuators 30, 31 is normally operated automatically by independent, related controls 32, 33 in response to position commands provided by separate, corresponding position command signal generators 60, 60a. Referring to the actuator 30, which is illustrative of the operation of the actuator 31, it may comprise a well-known jackscrew type of actuator having a reversible DC motor such that when a DC signal is applied to a lead 34 commensurately with a lead 35 being grounded, it will advance in a positive direction, but if the signal is applied to the lead 35 and the lead 34 is grounded, it will move in a negative direction. In normal operation, commands on the leads 34, 35, to cause the actuator 30 to operate in one direction or the other, are provided by the controls 32 in response to the difference between a position command signal on a line 57 from the command generator 60 and an actual position signal on a line 58 from a position sensor 59.

In order to determine whether the two, completely independent actuator systems are both operating properly, the current position as well as rate of change of position of the actuators are compared in a fault circuit 66a (which corresponds to but is an improvement over the fault circuit 66 shown in FIG. 5 of the copending application). A signal on the line 58 representative of the position ($\theta 1$) of the actuator 30 is compared with a signal on a line 64 from a position sensor 59a representing the actual position ($\theta 2$) of the actuator 31.

In accordance with the present invention, the position and rate of change thereof of the two actuators are compared against limits which are a function of airspeed. To this end, the airspeed signal on a line 116 (which is derived within the command generator 60) and a similar airspeed signal on a line 170 are utilized in the fault detector 66a to control the magnitude of disparity limits used in the comparison. At the top of the drawing, a function generator 171 generates an output signal as a function of airspeed which it utilized in the embodiment herein, to control both the position limit and the rate of change of position limit, for comparisons. The function generator 171 provides an output signal on a line 172 which is maximum and fixed for signals on the line 116 indicating speeds of 60 knots or less, and which decreases to about half that value between 60 knots and 150 knots, and which remains fixed above 150 knots. The signal on the line 172 is passed through an amplifier 173 which has a suitable gain so as to scale the signal in a desirable fashion to represent between 7° and 14° for high and low speeds, respectively, at its output 174. This output is applied to the negative limit input of a window comparator 175, and is also inverted in a unity gain inverting amplifier 176 so as to provide the positive limit control for the window comparator 175. The signal on the line 172 is also passed through an amplifier 177 which has a suitable gain so as to provide, at an output thereof 178, a signal which is representative of 8° per second at low speeds and 4° per second at high speeds. This signal is similarly applied to the negative limit control input of a window comparator 179, and after inversion in a unity gain amplifier 180, to the positive limit input of the window comparator 179.

The signals representing the two positions ($\theta 1$, $\theta 2$) are applied directly to a differencing amplifier 181, the output of which on a line 182 comprises the difference between the positions of the two actuators, which can be either positive or negative, and this is applied to the signal input of the window comparator 175. The position signals are also applied to a pair of differentiators 183, 184 so as to generate the rate of change with respect to time of the position of each of the actuators; the outputs of the differentiators are applied to a differencing amplifier 185, which provides at its output a signal indicating the difference in the rate of change of position of the two actuators on a line 186, which signal can either be plus or minus, and is applied to the signal input of the window comparator 179. The window comparators 175, 179 are well known devices which provide an output signal as on respective lines 180, 181 only in the event that the input signal falls outside either the positive or the negative limit. As an alternative, two separate biased comparators could be used in place of each of the window comparators, since their functions are identical.

The signals on the lines 180, 181 are applied to an OR circuit 98a to reset a bistable device 100 whenever there is disparity beyond that permitted for the current speed of the aircraft. When the bistable device 100 resets, it deenergizes the armature coil 102 of the fault relay 40, which in the controls 32, 33 transfers operation from being automatic in response to the command generators 60, 60a to being in response to a manual slewing switch 110, as is described in the aforementioned application. When the relay 100 becomes reset, it also will energize an alarm 114 of any suitable type, which may be any combination of visual or audible alarm to the pilot. The bistable device 100 is settable by a single shot 103 in response to momentary pressing of a reset switch 104 which connects a voltage from a source 105 to the input of the single shot 103. This ensures that the relay 100 will be on for approximately a second or so in response to a fixed-duration signal from the single shot 103; this assurance is required upon reset in order to allow automatic operation of the actuators to cause the actuators to assume similar positions before allowing the fault circuitry 66a to render the actuators insensitive to their controls. If desired, for complete redundancy, a second complete set of circuits 182, duplicating the circuitry 171-181 may be provided, the speed control over the limits thereof being established by the signal on the line 170 from a different airspeed sensing system. On the other hand, if redundancy is not desired, then the circuitry 171-181 may be utilized without redundancy. The circuitry 182 will provide signals on a pair of lines 183, 184 which are similar in function to that on the lines 180, 181, respectively.

As described briefly hereinbefore, one of the nuisance faults which has been determined to occur results from the fact that the airspeed sensing mechanism on the aircraft may either be erratic or may not track in pairs very well at lower speeds, thus requiring broader limits at lower speeds. In a completely redundant embodiment, including the circuitry 182, as shown in the drawing, the airspeed signal on the line 116 is utilized simply to set disparity limits for the circuitry 171-181; however, the effects of the airspeed signal on the line 170 in causing the command generator 60 to position the actuator 31 through the controls 33 is compared with the similar effect in the actuator 30 in response to a different airspeed signal. Thus, disparities in operation are tested in either the circuitry 171-181 or the circuitry 182-184 even though the limits may be set by only one of the airspeed sensors. If desired, redundant sets of comparison (including the apparatus 173-181 and similar apparatus in the circuitry 182) could be operated from a single function generator 171, since the establishment of various limits as a function of airspeed is in no way critical to the comparison to be made between the positions ($\theta1$, $\theta2$). Similarly, other obvious changes could be made in the apparatus while maintaining the function of the invention, which is varying limits for actuator comparison in response to airspeed.

Thus, although the invention has been shown and described with respect to an exemplary embodiment thereof, it should be understood by those skilled in the art that the foregoing and various other changes, omissions and additions in the form and detail thereof may be made therein and thereto, without departing from the spirit and the scope of the invention.

Having thus described in a typical embodiment of my invention, that which I claim as new and desire to secure by Letters Patent of the United States is:

1. A system for positioning a critical member on an aircraft with respect to another member thereon, comprising:
   a plurality of similar, independently operable actuator means, such operable in response to electrical signals applied thereto to advance or retard a portion thereof along a locus of possible positions of said portion, said actuators being connected in series with one another between the pair of members which are to be relatively positioned thereby;
   a plurality of electrical control means, each respectively corresponding to one of said actuator means, each receiving input signals and providing an electrical signal to the related one of said actuator means to cause it to advance or retard said portion thereof;
   a plurality of positioning sensing means, each respectively corresponding to a related one of said actuator means, each for providing an actual position signal related to the position of the corresponding one of said actuator means;
   airspeed sensing means for providing a signal indicative of the airspeed of the aircraft; and
   fault means responsive to said position sensing means and to said airspeed sensing means for comparing characteristics of the actual position signals of related ones of said actuator means against one another and for generating an alarm manifestation in response to said characteristics exhibiting a disparity in excess of a threshold disparity which is provided by said fault means in response to the airspeed signal provided by said airspeed sensing means.

2. A system according to claim 1 wherein said fault means responds to said airspeed sensing means to provide said threshold disparity of a greater magnitude at low speeds than at high speeds.

3. A system according to claim 2 wherein said fault means provides said threshold disparity signal in response to airpseed such that said threshold disparity is on the order of twice as great at low speeds as it is at high speeds.

4. A system according to claim 1 wherein said characteristics of said actual position signals include the magnitude thereof.

5. A system according to claim 1 wherein said characteristics of said actual position signals include the magnitude of the rate of change thereof with respect to time.

6. A system for positioning one member with respect to another member between limits defining the ends of a locus of permissible positions of said one member, comprising a plurality of servo loops, each of said servo loops including:
   position command signal generating means for generating a position command signal in response to input signals applied thereto, each of said generating means having similar input signals applied thereto;
   an actuator means, each of said actuator means having a similar response characteristic, said actuator means being connected in series with each other between said members, the actuation of all of said actuator means being required in order to position said one member at any point along its locus in response to said position command signals;
   position sensing means for providing an actual position signal as a manifestation related to the actual position of a corresponding one of said actuator means; and
   drive means responsive to said position command signal generating means and to said position sensing means for driving said actuator means to a desired position in closed loop servo fashion; and further comprising:
   airspeed sensing means for providing a signal indicative of the airspeed of said aircraft; and
   fault means connected for response to the position sensing means of said servo loops and to said airspeed sensing means for comparing characteristics of the actual position signals of at least a pair of said servo loops to determine if they are within a magnitude of disparity of each other, said magnitude being a function of the airspeed signal provided by said airspeed sensing means.

7. A system according to claim 6 wherein said characteristics of said actual position signals include the magnitude thereof.

8. A system according to claim 6 wherein said characteristics of said actual position signals include the magnitude of the rate of change thereof with respect to time.

9. A system according to claim 6 wherein said fault means responds to said airspeed sensing means to provide said threshold disparity of a greater magnitude at low speeds than at high speeds.

10. A system according to claim 9 wherein said fault means provides said threshold disparity signal in response to airspeed such that said threshold disparity is on the order of twice as great at low speeds as it is at high speeds.

* * * * *